(12) United States Patent
Lehnhardt et al.

(10) Patent No.: US 10,439,992 B2
(45) Date of Patent: Oct. 8, 2019

(54) SYSTEM FOR ACCESSING DATA

(71) Applicant: CompuGROUP Medical SE, Koblenz (DE)

(72) Inventors: Jan Lehnhardt, Koblenz (DE); Tobias Rho, Bonn (DE)

(73) Assignee: CompuGROUP Medical SE, Koblenz (DE)

( * ) Notice: Subject to any disclaimer, the term of this patent is extended or adjusted under 35 U.S.C. 154(b) by 40 days.

(21) Appl. No.: 15/011,822

(22) Filed: Feb. 1, 2016

(65) Prior Publication Data

US 2017/0041298 A1 Feb. 9, 2017

(30) Foreign Application Priority Data

Aug. 6, 2015 (DE) .................... 20 2015 104 128 U

(51) Int. Cl.
*H04L 29/06* (2006.01)
*G06F 16/22* (2019.01)
(Continued)

(52) U.S. Cl.
CPC ...... *H04L 63/0428* (2013.01); *G06F 16/2228* (2019.01); *G06F 16/2282* (2019.01);
(Continued)

(58) Field of Classification Search
None
See application file for complete search history.

(56) References Cited

U.S. PATENT DOCUMENTS

| | | | | |
|---|---|---|---|---|
| 5,644,763 A * | 7/1997 | Roy | ................. | G06F 17/30327 |
| 2014/0164352 A1* | 6/2014 | Denninghoff | ...... | H03H 9/02622 |
| | | | | 707/711 |
| 2017/0054716 A1* | 2/2017 | Egorov | ............... | G06F 21/6227 |

FOREIGN PATENT DOCUMENTS

EP 2731046 A1 * 5/2014 ......... G06F 21/6218

OTHER PUBLICATIONS

Raluca Ada Popa, Frank H. Li, Nicholai Zeldovich; "An Ideal-Security Protocol of Order-Preserving Encoding"; 2013; IEEE; 2013 IEEE Symposium on Security and Privacy; pp. 463-477.*

(Continued)

*Primary Examiner* — Kambiz Zand
*Assistant Examiner* — Arezoo Sherkat
(74) *Attorney, Agent, or Firm* — Harness, Dickey & Pierce, P.L.C.

(57) ABSTRACT

The present disclosure relates to a computer system for inserting multiple data items in a relation, the relation being stored on a server computer of the computer system, the relation comprising data items, wherein the data items are encrypted with a first encryption method in the relation, wherein the data items form a partially ordered set in the relation, the partial order being formed with respect to the data items in non-encrypted form. The computer system further comprises a client system, wherein for inserting multiple encrypted data items in the partially ordered set: the client system is configured for determining that the multiple data items have a same insert position in the partially ordered set; sorting the multiple encrypted data items in accordance with a linear order corresponding to the order in which the encrypted data items are stored in the relation with respect to the partial ordered set, wherein depending on the insert position the sorting is performed in ascending or descending order; encrypting the multiple data items using the first encryption method; and the server system is configured for inserting the encrypted data items in the partially ordered set consecutively in their sorted order.

19 Claims, 4 Drawing Sheets

(51) Int. Cl.
*G06F 21/62* (2013.01)
*G06F 16/23* (2019.01)
*G06F 16/245* (2019.01)
*H04L 9/30* (2006.01)

(52) U.S. Cl.
CPC ............ *G06F 16/23* (2019.01); *G06F 16/245* (2019.01); *G06F 21/6227* (2013.01); *H04L 9/30* (2013.01); *H04L 63/06* (2013.01); *H04L 63/10* (2013.01); *G06F 16/2246* (2019.01)

(56) References Cited

OTHER PUBLICATIONS

Rakesh Agrawal, Jerry Kiernan, Ramaskarishnan Srikant, and Yirong Xu; "Order Preserving Encryption for Numeric Data"; Jun. 2004; ACM Digital Library; SIGMOD '04 Proceedings of the 2004 ACM SIGMOD international conference on Management of data; pp. 563-574.*

* cited by examiner

SYSTEM FOR ACCESSING DATA

CROSS-REFERENCE TO RELATED APPLICATIONS

This is a U.S. non-provisional patent application which claims priority under 35 U.S.C. § 119 to, German Patent Application No. 202015104128.4, filed Aug. 8, 2015, the entire contents of which are incorporated herein by reference.

BACKGROUND

The present disclosure relates to a system for managing data. Specifically, the disclosure relates to a medical system for allowing exchange of health data between multiple devices.

Indexes are commonly used to improve the speed of data retrieval operations on a database table at the cost of additional writes and storage space to maintain the index data structure. Indexes are used to quickly locate data without having to search every row in a database table every time a database table is accessed. However, in systems such as medical systems that maintain patient's sensitive data, the indexes may be an additional source of intrusion or of unauthorized access to the health data. Thus, there is a need to ensure a secure access and manipulation of the indexes.

SUMMARY

Various embodiments provide a computer system for inserting data items in a relation, a server system and a client system as described by the subject matter of the independent claims. Advantageous embodiments are described in the dependent claims. Embodiments of the present invention can be freely combined with each other if they are not mutually exclusive.

In another aspect, the invention relates to a computer system for inserting multiple data items in a relation, the relation being stored on a server computer of the computer system, the relation comprising data items, wherein the data items are encrypted with a first encryption method in the relation, wherein the data items form a partially ordered set in the relation, the partial order being formed with respect to the data items in non-encrypted form. The computer system further comprises a client system, wherein for inserting multiple encrypted data items in the partially ordered set: the client system is configured for determining that the multiple data items have a same insert position in the partially ordered set; sorting the multiple encrypted data items in accordance with a linear order corresponding to the order in which the encrypted data items are stored in the relation with respect to the partial ordered set, wherein depending on the insert position the sorting is performed in ascending or descending order; encrypting the multiple data items using the first encryption method; and the server system is configured for inserting the encrypted data items in the partially ordered set consecutively in their sorted order.

In another aspect, the invention relates to a server computer of a computer system of previous embodiments, the computer system comprising a relation, the relation being stored on a server computer of the computer system, the relation comprising data items, wherein the data items are encrypted with a first encryption method in the relation, wherein the data items form a partially ordered set in the relation, the partial order being formed with respect to the data items in non-encrypted form, the server computer being configured for: inserting encrypted data items in the partially ordered set consecutively in their sorted order.

In another aspect, the invention relates to a client computer of a computer system of previous embodiments, the computer system comprising a relation, the relation being stored on a server computer of the computer system, the relation comprising data items, wherein the data items are encrypted with a first encryption method in the relation, wherein the data items form a partially ordered set in the relation, the partial order being formed with respect to the data items in non-encrypted form, wherein for inserting multiple encrypted data items in the partially ordered set: the client computer is configured for: determining that the multiple data items have a same insert position in the partially ordered set; sorting the multiple encrypted data items in accordance with a linear order corresponding to the order in which the encrypted data items are stored in the relation with respect to the partial ordered set, wherein depending on the insert position the sorting is performed in ascending or descending order; encrypting the multiple data items using the first encryption method.

Further, a method for inserting multiple data items in a relation is described, the relation being stored on a server computer, the relation comprising data items, wherein the data items are encrypted with a first encryption method in the relation, wherein the data items form a partially ordered set in the relation, the partial order being formed with respect to the data items in non-encrypted form. The method comprises for inserting multiple encrypted data items in the partially ordered set: determining that the multiple data items have a same insert position in the partially ordered set; sorting the multiple encrypted data items in accordance with a linear order corresponding to the order in which the encrypted data items are stored in the relation with respect to the partial ordered set, wherein depending on the insert position the sorting is performed in ascending or descending order; encrypting the multiple data items using the first encryption method; inserting the encrypted data items in the partially ordered set consecutively in their sorted order.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
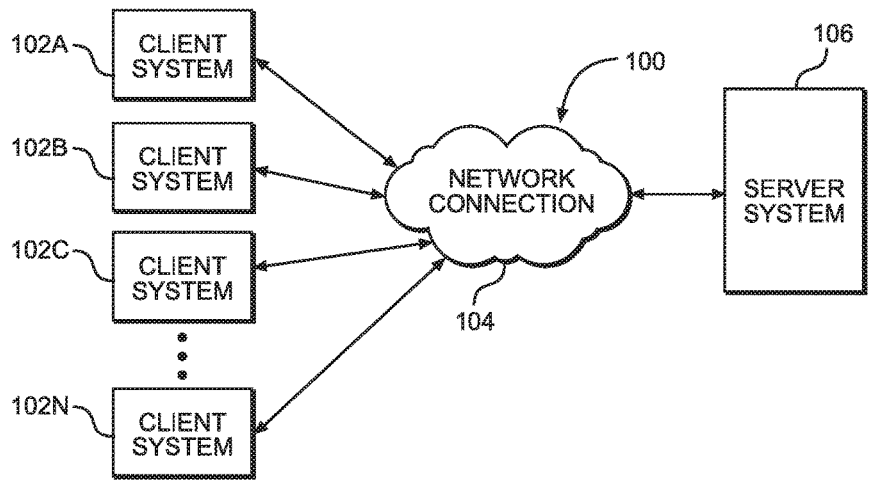
FIG. 1 depicts a schematic block diagram of a client-server system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term relation refers to a data structure equivalent to a data table, such as a data table of a database system.

A partially ordered set is understood as a set of data elements that formalizes the concept of an ordering, sequencing, or arrangement of the elements of a set. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes in a direct manner the other in the partially ordered set. The partially ordered set may refer to a data structure in which data items are related to each other in the relation. The data structure may comprise a tree structure or a similar indexing data structure with pointers or references to the records which contain the corresponding values associated with the data items. For example, the partially ordered set may comprise an AVL tree or a binary search tree (BST). The tree keeps the data items in sorted order, as this may speed up the traversal of the tree.

The first encryption method may comprise may comprise an arbitrary encryption method. For example, the first encryption method may comprise a non-deterministic encryption method, a homomorphic encryption method or an order preserving encryption method. The first encryption method, when executed for a given data item, encrypts the data item using for example a cryptographic key. In accordance with an embodiment, the cryptographic key is a symmetric or an asymmetric key. A second encryption method which is the same or different from the first encryption method may be used to encrypt the data records which contain the corresponding values associated with the data items of the partially ordered set.

A "cryptographic key" as used herein encompasses a symmetric key that serves both for encryption and decryption as well as an asymmetric cryptographic key pair, where the public key is used for encryption and the private key is used for decryption.

The term "data item" as used herein refers to a data value of a data element of a set of elements like for example a tuple that comprises one or more data elements, such as a data value of a data field of a data record that has multiple data fields, within a database, such as a relational data-base, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items. A data item may comprise a string of characters that may comprise a plurality of letters, numbers, or both. The data item may comprise a number having integer value or float value etc.

The above features may have the advantage of enabling to speed up the process of updating or modifying the partially ordered set (e.g. a tree data structure) while minimizing the number of traversals of the partially ordered set. This is in contrast to conventional methods where every single node insertion may require a respective rebalancing and traversal of the tree which results in a delayed access to data.

Another advantage may be that the present method and system may enable a secure access to the data via the partially ordered set. This may particularly be important for health system's sensitive data. The manipulation of the multiple data items (and also data items of the partially ordered set) at the server side can be performed without having to decrypt the multiple data items at the server computer i.e. the server computer may have no access to the cryptographic key or the unencrypted content of multiple data items. Thus, the risk of compromising the multiple data items at the server computer may be mitigated.

The present method and system may further have the advantage of enabling a (remote) control access to data via client systems. This may particularly be advantageous for medical related data for which a centralized control access to data may not be suitable. For example, the confidentiality of medical data (e.g. data items and associated data records) may be compromised if an unauthorized user has access to unencrypted content of the medical data.

According to one embodiment, a request for inserting the multiple data items is received at a single client computer, wherein the sorting is performed by the single client computer using the unencrypted content of the multiple data items to be inserted. This embodiment may have the advantage of enabling a secure access to the data at the server side as the decryption is performed at the client side. The server computer may not have access to the unencrypted content of the multiple data items.

According to one embodiment, the determining that the multiple data items have a same insert position in the partially ordered set is performed in parallel at the client computer that is connected to the server computer and completed before starting the inserting. For example, the client computer may traverse the partially ordered set (e.g. a rooted tree) via the computer server by sending one or more requests to the server computer for obtaining one or more portions of the partially ordered set. The client computer may then decrypt data items of the received portions in order to traverse the received portions for determining that the multiple data items have a same insert position. The determining that the multiple data items have a same insert position in the partially ordered set is performed in parallel comprises for each received portion executing concurrently the identification of the position of each of the multiple data items. This may have the advantage of further speeding up the whole process of inserting the multiple data elements at the server computer.

According to one embodiment, the sorting is performed in descending order if the insert position has a corresponding order in the partially ordered set that succeeds the order of an immediately preceding data item of the insert position, wherein the sorting is performed in ascending order if the insert position has a corresponding order in the partially ordered set that precedes the order of an immediately preceding data item of the insert position. This may provide an accurate method for inserting the data items by avoiding as much as possible the need of (re)traversing the partially ordered set after each insertion. This may thus save processing resources that would otherwise be required if the multiple data items are sorted differently or not sorted at all.

According to one embodiment, the partially ordered set is comprising a rooted tree, wherein the insert position has a leaf node as its parent node in the rooted tree.

According to one embodiment, the partially ordered set is comprising a rooted tree, the inserting of the multiple data items comprises for each data item of the multiple data items: in response to determining that the insert position is free inserting the data item in the insert position described by the parent node of the insert position and information indicating whether the insert position has an order that is preceding or succeeding the parent node; in response to determining that the insert position is occupied: in case the sorting is performed in a descending order inserting the data item in a position making the data item the lowest ordered item in the parent node's subtree which contains only data items ordered higher than the parent node (in other words, the data item is inserted in a position of the rooted tree having an order preceding the lowest ordered node of the right subtree of the parent node); in case the sorting is performed in an ascending order inserting the data item in a position making the data item the highest ordered item in the parent node's subtree which contains only data items ordered lower than the parent node (in other words, the data item is inserted in a position of the rooted tree having an order succeeding the highest ordered node of the left subtree of the parent node). This may provide an optimal and systematic method for inserting items having the same insert position. By providing that systematic method, this embodiment may particularly be advantageous when a large amount of the data items having the same insert position is to be inserted.

According to one embodiment, it is further disclosed that after each inserting step and in response to determining that the rooted tree is imbalanced the rooted tree is rebalanced. This may provide a method that may be seamlessly integrated with existing balanced trees such as AVL trees.

According to one embodiment, multiple requests for inserting the multiple data items are received at the client computer simultaneously. This embodiment may have the advantage of further speeding up the insertion process compared to a case where the multiple data items are received during a long time period. This embodiment may particularly be advantageous when a large amount of the data items having the same insert position is to be inserted as the time period required to receive e.g. consecutively the multiple data items may introduce delays in the insertion process.

According to one embodiment, multiple requests for inserting the multiple data items are collected at the client computer during a predetermined time period. This embodiment may be advantageous in case of a bulk insertion that may involve the movement and insertion of, for example, a whole (remote) database of the data items into the partially ordered set.

According to one embodiment, the first encryption method is an order preserving encryption method, wherein the sorting is performed by the server computer based on the encrypted content of the multiple data items, the multiple data items being encrypted using the first encryption method. This may have the advantage of further speeding up the process of insertion; in particular where multiple client computers are receiving the multiple data items. This is because, for example, the multiple data items would have to be copied or moved to a given client computer before being sorted by that given client computer and transferred back to the server before being inserted into the database.

According to one embodiment, requests for inserting the multiple data items are received at multiple client computers, the first encryption method being a nondeterministic encryption method, wherein the sorting comprises: selecting a client computer of the multiple client computers for sorting of the multiple data items. The selection of the client computer may comprise selecting randomly a client computer f the multiple client computers.

According to one embodiment, the partially ordered set comprises an AVL tree or a binary search tree. This embodiment may be advantageous as it may be seamlessly integrated with existing systems using these trees.

FIG. 1 shows a schematic block diagram of a client-server system 100 in accordance with the present disclosure. The client-server system 100 comprises one or more client systems (or client computers) 102A-N and a server system (or server computer) 106. The client system 102A-N and the server system 106 are connected over a network connection 104. The client system 102 can be regarded as a computer system that is able to communicate with the server system 106 via the network connection 104 which comprises for example a wireless local area network (WLAN) connection, WAN (Wide Area Network) connection LAN (Local Area Network) connection or a combination thereof. The server system 106 can be regarded as a computer system that is able to provide data access to the client system 102. In order to access data stored on the server 106, the client system 102 sends a request to the server 106, where the request is received and processed at the server system 106.

For example, client-server system 100 may be a medical system, in which the client system 102 may be part of a medical office or a hospital and the server system 106 may be located in an external database center, like a cloud computing center.

For example, a client system 102 may comprise a portable electronic telecommunication device, such as a mobile radio or a digital cellular mobile telephone, such as a smartphone or tablet computer. This may particularly be beneficial for applications that involve terrestrial users in vehicles or on foot, such as for emergency responder organizations or public works organizations. In the field of the provision of healthcare services this may particularly be beneficial as it may enable the use of a mobile portable battery powered client device in the context of emergency medical services and/or home visits of patients by medical doctors, while maintaining high data privacy standards.

As used herein the term "server" refers to any computerized component (e.g. a software component), system or entity regardless of form that is adapted to provide data, files, applications, content, or other services to one or more other devices or entities.

In the following the terms "relation", "rooted tree", "partially ordered set" and "index tree" are interchangeably used.

Figure 2:
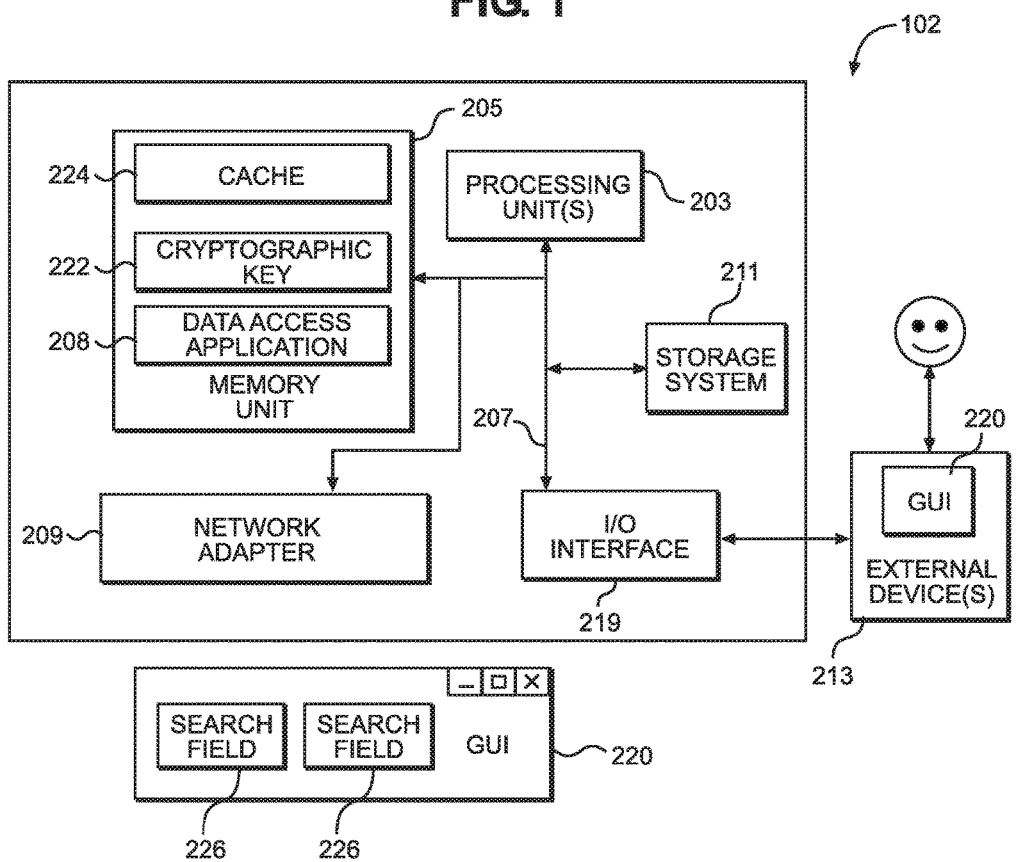
FIG. 2 depicts a schematic block diagram of a server system.

FIG. 2 shows a schematic block diagram of a client system 102 in accordance with the present disclosure. The components of client system 102 may include, but are not limited to, one or more processors or processing units 203, a storage system 211, a memory unit 205, and a bus 207 that couples various system components including memory unit 205 to processor 203. Storage system 211 may include for example a hard disk drive (HDD). Memory unit 205 may include computer system readable media in the form of volatile memory, such as random access memory (RAM) and/or cache memory. Client system 102 typically includes a variety of computer system readable media. Such media may be any available media that is accessible by client system 102, and it includes both volatile and non-volatile media, removable and non-removable media.

Client system 102 may also communicate with one or more external devices such as a keyboard, a pointing device, a display 213, etc.; one or more devices that enable a user to interact with client system 102; and/or any devices (e.g., network card, modem, etc.) that enable client system 102 to communicate with one or more other computing devices. Such communication can occur via I/O interface(s) 219. Still yet, client system 102 can communicate with one or more networks such as a local area network (LAN), a general wide area network (WAN), and/or a public network (e.g., the Internet) via network adapter 209. As depicted, network adapter 209 communicates with the other components of client system 102 via bus 207.

Memory unit 205 is configured to store applications that are executable on the processor 203. For example, the memory system 205 may comprise an operating system as well as application programs. The application programs comprise a data access application 208. The data access application 208 comprises instructions that when executed enable a user of the client system 102 to request data residing on server system 106. For example, the execution of the instructions may cause the processor 203 to display a graphical user interface 220. The graphical user interface 220 comprises search fields 226 that are configured to receive inputs indicative for example of a range or interval searches. The interval search may, for example, represent a string prefix search such as "Ped*". For example, the user may enter a prefix search Ped* into a search field 226 of the graphical user interface 220. The prefix search may be transformed by the data access application 208 into an interval search e.g. ["Ped"; "Pee"[, that would cover the requested data that are associated with users having a name starting with "Ped".

Memory unit 205 is further configured to store a cryptographic key 222. The cryptographic key 222 may be used to encrypt data items that are accessible by the client system 102. for example, since the client system 102 and the server system 106 may be used for handling of medical data records, it may be crucial that any information leaving the client system 102 and thus the environment of a medical office is kept confidential at the destination e.g. server system 106. It has to be ensured that no unauthorized user may have access to patient data records at the server system 106.

The client system 102 may further comprise a cache 224. The term "cache" as used herein refers to a temporary storage area that is a high-speed access area and may be either a memory cache or a disk cache. The cache may, for example, be a portion on memory of high-speed static RAM (SRAM) or may be part of main memory e.g. made up of dynamic RAM (DRAM).

Figure 3:
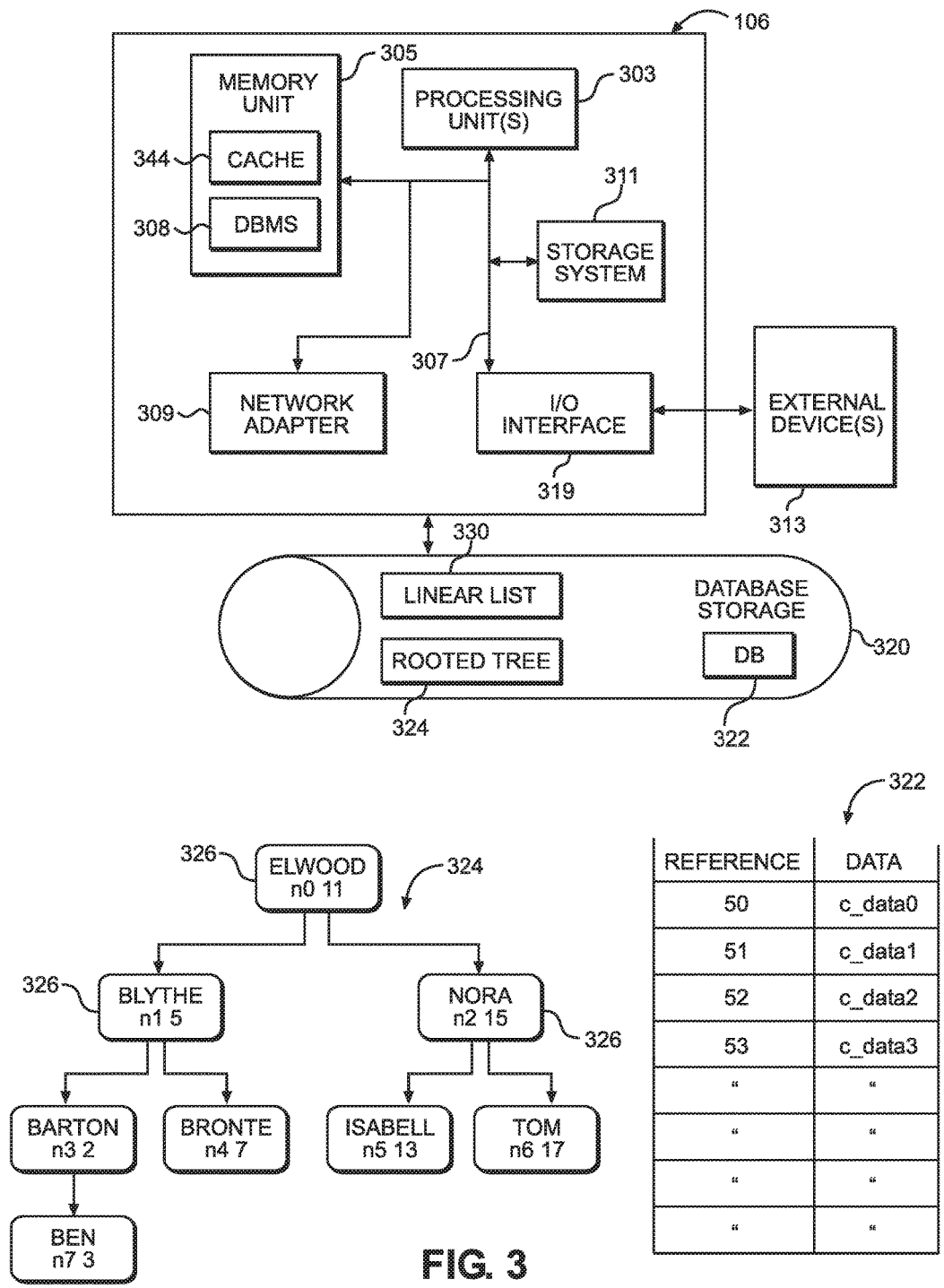
FIG. 3 depicts schematic block diagram of a client system.

FIG. 3 shows a schematic block diagram of a server system 106 in accordance with the present disclosure.

The components of server system 106 may include, but are not limited to, one or more processors or processing units 303, a storage system 311, a memory unit 305, and a bus 307 that couples various system components including memory unit 305 to processor 303. Storage system 311 may include for example a hard disk drive (HDD). Memory unit 305 may include computer system readable media in the form of volatile memory, such as random access memory (RAM) and/or cache memory. Server system 106 typically includes a variety of computer system readable media. Such media may be any available media that is accessible by server system 106, and it includes both volatile and non-volatile media, removable and non-removable media.

Server system 106 may also communicate with one or more external devices such as a keyboard, a pointing device, a display 313, etc.; one or more devices that enable a user to interact with the server system 106; and/or any devices (e.g., network card, modem, etc.) that enable server system 106 to communicate with one or more other computing devices. Such communication can occur via I/O interface(s) 319. Still yet, server system 106 can communicate with one or more networks such as a local area network (LAN), a general wide area network (WAN), and/or a public network (e.g., the Internet) via network adapter 309. As depicted, network adapter 309 communicates with the other components of server system 106 via bus 307.

Memory unit 305 is configured to store applications that are executable on the processor 303. For example, the memory system 305 may comprise an operating system as well as application programs. The application programs comprise a database management system (DBMS) 308 that enables to store, modify, and extract data from database storage 320 of the server system 106. Requests for information from database storage 320 are made for example in the form of queries. For example, the query may be an SQL query. The database storage 320 may comprise a database 322 comprising data e.g. patient data. The content of the database 322 may be encrypted e.g. using the cryptographic key 222 at the client system 102. The data access (e.g. data retrieval) to the database 322 may be performed using a rooted tree 324. For example, the rooted tree 324 may comprise patient names that may be used to access the data in the database 322 that belong to each of the names. The rooted tree 324 may for example be an index, thereby it is referred to herein as index tree 324. The index tree 324 may comprise multiple data items represented by nodes 326. For simplicity of the description data items and nodes are interchangeably used herein. The index tree 324 comprises data items that are encrypted at client computer systems 102. The encryption of the data items of the index tree 324 may be performed using a cryptographic key 222 that is stored at the client system 102 where the encryption is performed. This may prevent the server system 106 from accessing the decrypted content of the data items 326 of the index tree 324.

The data items 326 of the index tree 324 may be sorted in numerical or lexicographical order or a combination thereof. The sorting may be performed using the unencrypted content of the data items of the index tree 324. This may be performed at the client system 102 as the client system 102 may have right access to the unencrypted content of the data items of the index tree 324. In another example, the server system 106 may perform the sorting of the data items 326 of the index tree 324 based on their encrypted content, wherein the data items are encrypted using an order preserving encryption method. This is particularly advantageous as the server system 106 may not have right access to the unencrypted content of the data items 326.

For example, each data item 326 of the index tree 324 may comprise a patient name in the encrypted format and a reference (or referential connection) to data related to that patient in the database 322. The references assign each data item 326 to corresponding data c_data stored in the database 322. The data c_data may be encrypted using the same or different encryption method that is used to encrypt the data items 326. For simplicity of the description the data items 326 are shown in plain text although the data items 326 are encrypted and the server system 106 has no access to the unencrypted (i.e. plain text) content of the data items 326.

For example, the index tree 324 is sorted according to the lexicographic order of the patient names in the unencrypted form. The index tree 324 may or may not be a balanced tree. For example, the index tree 324 may comprise an AVL tree or a binary search tree.

Server system 106 may further comprise a linear list 330. The linear list comprises data elements associated with the data items 326. The elements of linear order are shown in integer numbers, for example 2, 5, 11 etc. The data elements having in the list a linear order corresponding to the order in which the encrypted data items 326 are stored in the index tree 324. The linear list 330 may be used to identify the data items that belong to a given range and search interval. Each element of the linear list 330 may comprise a reference to data of the database 322 that correspond to the data item 326 represented by that element. The usage of the linear list 330 may be advantageous as the access to the linear list 330 may be faster than the access to index tree 324.

The server system 106 may further comprise a cache 324.

The client-server system 100, the client system 102 and the server system 106 will be described in details with reference to FIGS. 2-6.

Figure 4:
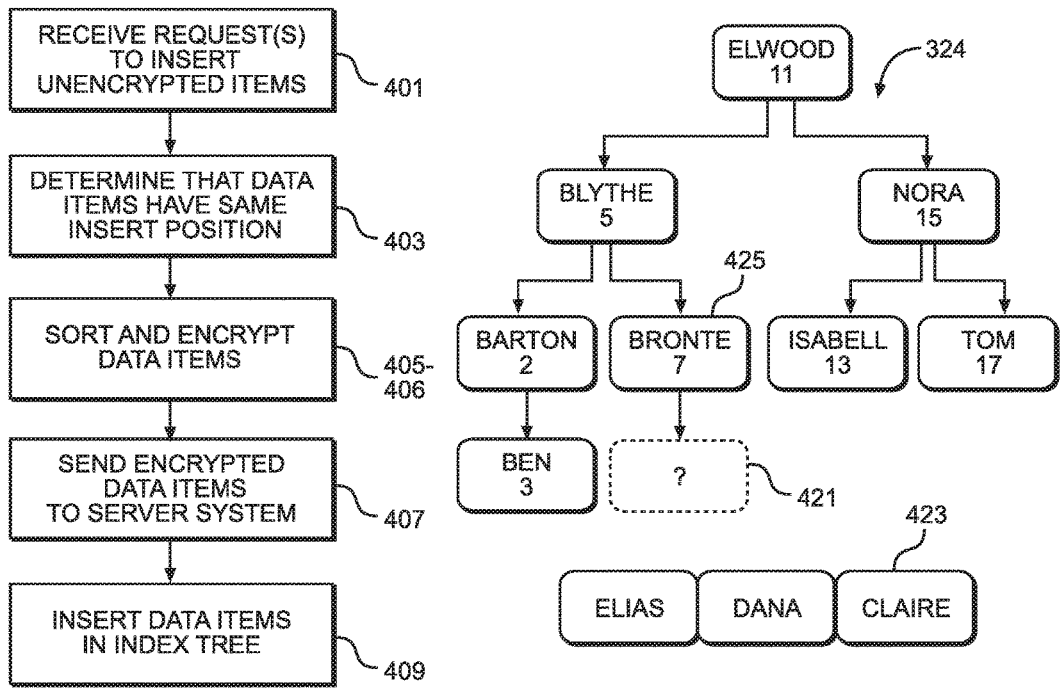
FIG. 4 is a flowchart of a method for inserting data items in a relation.

FIG. 4 is a flowchart of a method for inserting data items 423 in a relation e.g. index tree 324. In step 401, a client system 102 may receive one or more requests for inserting multiple unencrypted items e.g. patient names ("Elias", "Dana" and "Claire") 423 and their associated data in the server system 106.

The requests may be received simultaneously at the client computer 102. For example, the user may enter two patient names in the graphical user interface 220 and may trigger the insertion request at once. The requests may further indicate data to be associated with the received items and that have to be stored on the database 322.

In another embodiment, the requests may be received during a predefined time period. For example, during that time period the client system 102 may maintain the insertion requests before executing the requests at once. For example, different users of the client system, 102 may send the requests at different points in time during the predefined time period.

In step 403, upon receiving the requests the client system 102 may determine that the multiple data items have a same insert position in the index tree 324. For that, the client system 102 may traverse the index tree 324 via the server system 106 i.e. the client system, 102 may guide or instruct the server system 106 to traverse the index tree 324 and to provide data items of the index tree 324 to the client system 102. The client system 102 may establish a connection via network 104 to the server system 106, and may send successive requests using a protocol such as HTTP to the server system 106. For each of the successive requests, the client system 102 may request a portion of the index tree 324. The portion of the index tree 324 may comprise one or more data items 326. For example, in case the requested portion of the index tree 324 comprises more than one node, the respective request may further indicate the height of the requested portion.

The first request of the successive requests may request a first portion of the index tree 324 that comprises the root node. The received first portion is decrypted by the client computer 102 e.g. using the cryptographic key with which the data items of the index tree 324 are encrypted. Using the received content of the unencrypted items the client computer 102 may determine if each of the received items 423 can be inserted in the received first portion, and if not, the client system 102 may proceed with the following second request for requesting a second portion of the index tree 324. Upon receiving the second portion, the client system 102 may repeat what has been performed with the first portion to determine if each of the received items can be inserted in the received second portion. The client system 102, however, for the second request may process the second portion in combination with the previously received portions i.e. the first portion.

After one or more successive requests the client system 102 may be able to determine that the multiple data items 423 have a same insert position in the index tree 324. For example, "Elias", "Dana" and "Claire" can be inserted in the insert position 421.

For example, the received requests may indicate that multiple data items 423 may be inserted below the leaf level of the index tree 324. In this case, the client system 102 may perform successive requests for requesting portions that contain the leaf nodes of the index tree 324.

In step 405, the client system 102 may sort the multiple data items 423 using their unencrypted content. In step 406, the client system 102 may encrypt the multiple data items 423 using the same encryption method used to encrypt the data items 326 of the index tree 324. The sorting may be performed in accordance with a linear order corresponding to the order in which the encrypted data items are stored in the index tree 324.

For example, the sorting is performed in descending order (i.e. "Elias" first ranked followed by "Dana" and "Claire") if the insert position 421 has a corresponding order in the partially ordered set (index tree 324) that succeeds the order of an immediately preceding data item 425 of the insert position 421. The sorting may however be performed in ascending order if the insert position 421 has a corresponding order in the partially ordered set that precedes the order of an immediately preceding data item of the insert position 421. In other words, if the insert position is on the right (left) side of the parent node 425, then the sorting is performed in descending (ascending) order. In this way, the data items 423 can be efficiently inserted e.g. by avoiding to insert a data item second ranked before inserting the first ranked data item, which may then result in an unnecessary re-traversing of the index tree 423. If for example, the second-ranked data item is inserted before the first-ranked item, a new tree traversal may be required to find the correct insert position as it may not be easy to find the correct insertion point after inserting the second-ranked data item.

In one embodiment, the sorting of the data items 423 may be performed by the server system 106 (e.g. by the DBMS 308) in case the encryption method that has been used to encrypt the data items 423 (and the data items of the index tree) is an order preserving method.

In step 407, the client system 102 may send the encrypted data items to the server system 106. For example, the client system 102 may send one data item after the other in accordance with their order. In another example, the data items may be sent at once by the client system 102 to the server system 106. The submission of the data items may further comprise instructions that may be executed by the server system 106 in order to insert the submitted data items in the index tree 324.

In step 409, the server system 106 may insert the data items in the index tree 324 consecutively in their sorted order by executing the received instructions.

Figure 5:
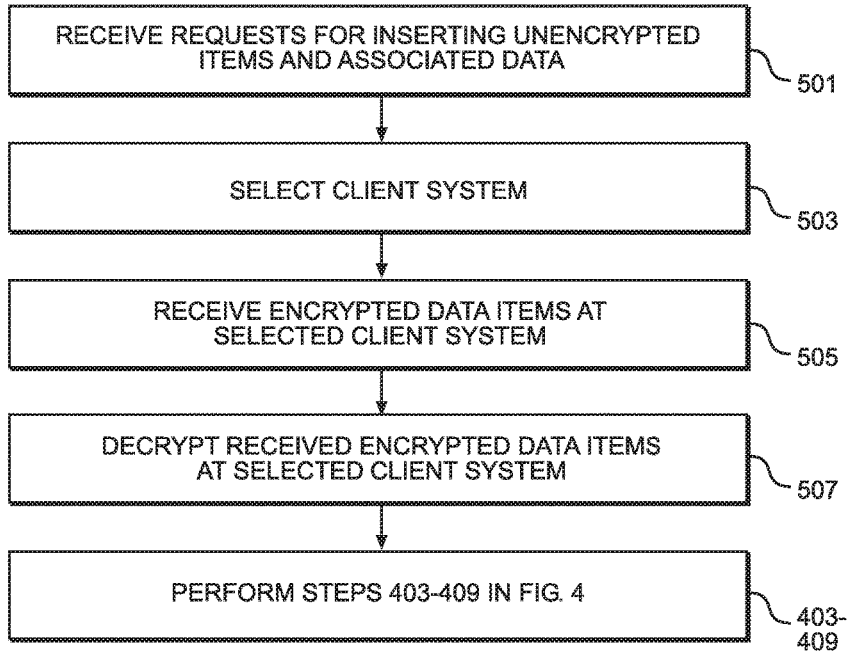
FIG. 5 is a flowchart of an exemplary method for inserting data items in the relation.

FIG. 5 is a flowchart of another exemplary method for inserting data items 423 in index tree 324.

In step 501, multiple client systems 102A-C may receive multiple requests for inserting multiple unencrypted items 423 and their associated data in the server system 106. For example, each of the multiple client systems 102 may receive a respective data item of the data items 423. A first user may enter the name "Elias" in a field 226 of the graphical user interface 220 of the client system 102A. A second user may enter the name "Dana" in a field 226 of the graphical user interface 220 of the client system 102B. A third user may enter the name "Claire" in a field 226 of the graphical user interface 220 of the client system 102C.

The term "user" may refer to an entity e.g., an individual, a computer, or an application executing on a computer that issues requests to insert data items or performing a database search.

For example, the client-server system 100 may provide a cloud environment where the multiple client systems 102A-C may form a group of computers that is part of multiple groups or clusters of computers in the cloud environment. The multiple client systems 102A-C may act like a single system that provides services to respective users of the cloud environment. For example, the multiple client systems 102A-C may be assigned a common group public key and a group private key that can be used to (uniformly) encrypt the data at the multiple client systems 102A-C.

For example, the multiple client systems 102A-C may belong to an organizational entity, such as a health service provider, and may be located in a respective access restricted environment, such as a hospital. Access restriction to the environment can be implemented by physical, such as edificial, and/or organizational measures and/or by an electronic access control system. Such restricted environment is a trusted environment in which confidentiality of data items, such as patients' medical records, is preserved.

As the requests are received at different client systems 102A-C, a selection of a client system of the multiple client systems 102A-C may be performed in step 503 in order to perform the steps 403-407. The selection may, for example, be received at each of the client systems 102A-C indicating that a client system e.g. 102A has been selected for performing steps 403-407. Based on the received indication the client systems 102B and 102C may encrypt the respective data items ("Dana", and "Claire") using the pair of the group public and/or private keys. Upon receiving in step 505 by the selected client system 102A the encrypted data items 326 from the client systems 102B and 102C, the selected system 102A may decrypt in step 507 the received encrypted items using the group public and/or private keys.

The selection may be sent to each of the client systems 102A-C by a user of the client-server system 100 or by the server system 106. The selection may be a random selection. In another example, the selection may comprise obtaining via a network component (not shown) of the client server system 100 information on processing loads for each of the client systems 102A-C, and selecting a client system 102A with a greatest available CPU processing power.

After decrypting step 507, steps 403-409 may be executed as described above with reference to FIG. 4.

Figure 6:
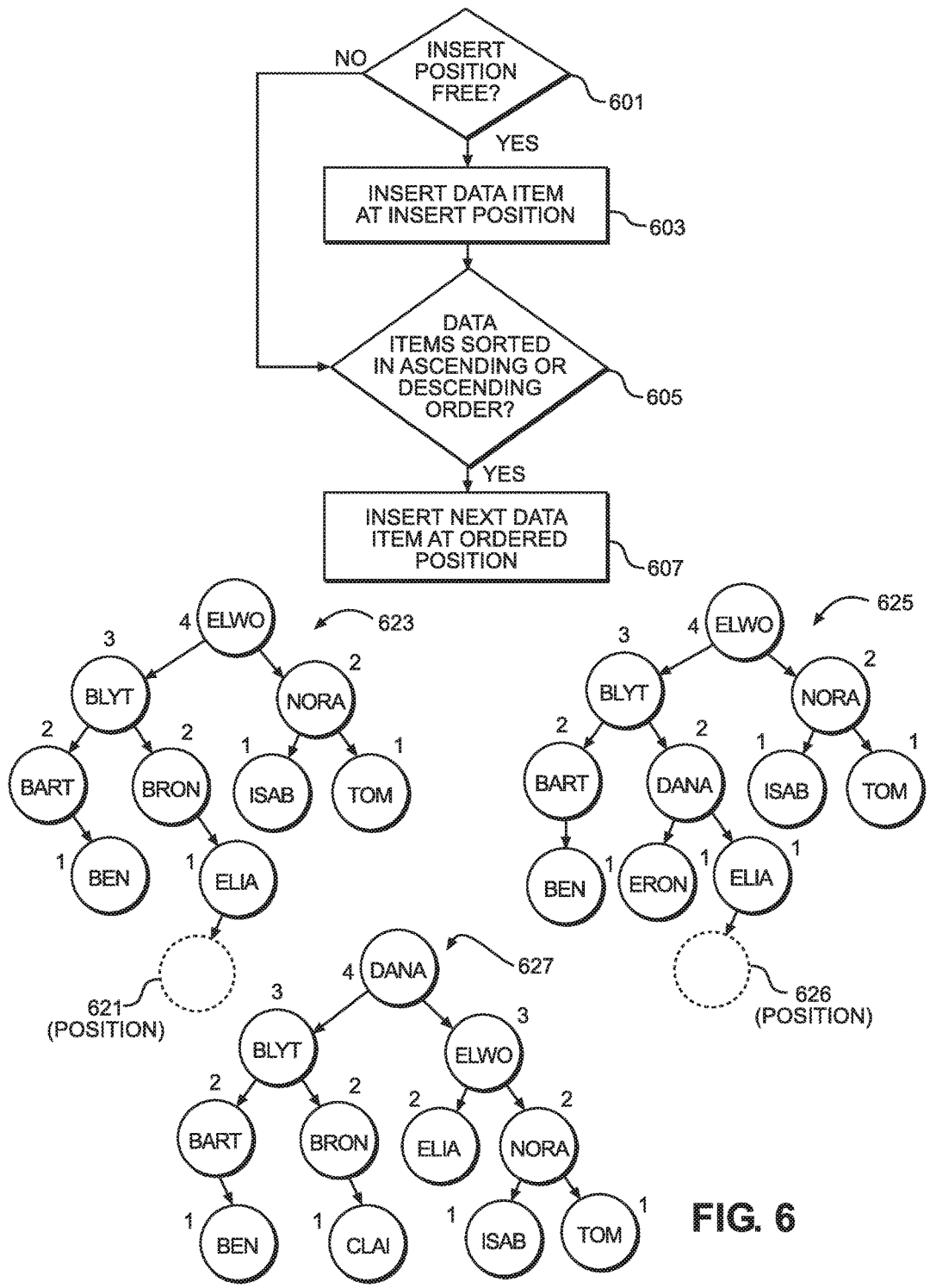
FIG. 6 is a flowchart of another exemplary method for inserting data items in the relation.

FIG. 6 is flowchart of a method further detailing the step 409. For example, the execution of the instructions received from the client system 102 at the server system 106 may cause the processor 303 to perform the steps 601-607 in order to insert data items "Elias", "Dana" and "Claire" in the index tree 324.

For example, the server system 106 may start with the first ranked data item "Elias" in order to insert data item "Elias". For that, the server system 106 may determine (inquiry 601) whether the insert position 421 is free. If the insert position 421 is free which is the case for the first ranked data item "Elias", the server system 106 may insert in step 603 the data item "Elias" in the insert position 421. This results in the index tree 623.

However, for the second ranked data item "Dana" the server system 106 may determine that the insert position 421 is occupied (by "Elias"). And in response, the server system 106 may determine (inquiry 605) whether the data items 423 are sorted in a descending or ascending order.

In this case, since the sorting is performed in a descending order (i.e. "Elias"→"Dana"→"Claire") the server system 106 may insert in step 607 the data item "Dana" in a position of the rooted tree 623 having an order preceding the lowest ordered node i.e. "Elias" of a subtree having data items ranked superior of the parent node 425. Thus, the data item "Dana" may be inserted in position 621. However, if the rooted tree 623 is a balanced tree the server system 106 may rebalance the rooted tree in order to obtain the new structure of the rooted tree 625.

For inserting the data item "Claire", the sever system 106 may repeat the steps 601-607. And the data item "Claire" may be inserted in position 626 of the rooted tree 625. And may thus rebalance again the rooted tree 625 to obtain the new structure of the rooted tree 627.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following a pipelining example method during read and write access will be described.

Pipelining During Read Access

When processing an interval search, every interval border may require a separate tree traversal, so when a query contains n interval conditions, up to 2n tree traversals may be necessary, each requiring H/h server roundtrips, which may turn out to be expensive when all $2n \cdot [H/h]$ subtree retrievals were executed consecutively. H is the tree height of index 324. h is the height of a subtree of the index 324.

Instead, all 2n traversals can be processed in parallel by the client computer, while the server computer performs all subtree retrievals in a single worker thread; hence, this procedure may rather be a pipelined subtree retrieval instead of a parallel one.

Nevertheless, because the server computer may not be the bottleneck in a system architecture like computer server system 100, the server computer can easily serve all the requests with little additional latency for the entire query response time. Hence, a query containing many range conditions may not take substantially longer than a query with only a single one.

Pipelining may also be applicable for write accesses as follows.

Consider n>1 items are to be added to the index e.g. 324 by the same client computer and have to be added as new nodes to the binary tree representation. Then the step of determining each node's designated parent node can be executed in parallel, for it consists solely of read-only tree accesses.

When all parent nodes are determined, insertion of the new index node with possibly necessary subsequent tree re-balancing can be performed. This has to be done by the server computer in a pipelined instead of parallel mode in order to avoid tree inconsistencies.

If all new nodes have different designated parent nodes; a simple sequence of nodes is sent to the server computer, which are all added to the tree 324 one after another. However, when the determined insert position for m>1 of the n new nodes is the same child position of the same parent node, a new node designated as the left child of a determined parent node is then either inserted exactly like that, if that place is currently not taken by another node, or inserted as the right child of the greatest item in the designated parent's left subtree.

All other tree usage steps (e.g. AVL usage steps) may remain the same, including tree rebalancing. If the client computer now inserts all m conflicting new nodes in an ordered fashion, starting with the smallest value proceeding to the greatest, the tree's (e.g. AVL tree) consistency may not be affected by the set of insertions.

Note that for the symmetric case, i.e., new nodes competing for being the right child of the same parent node, the above steps may be turned to their opposites: all new nodes are sorted from greatest to smallest, and a new node is either inserted as the right child of its parent node, or, if that place is taken, as the left child of the smallest value in the parent node's right subtree.

The invention may be described by the following feature combinations.

1. A method for inserting multiple data items in a relation, the relation being stored on a server computer, the relation comprising data items, wherein the data items are encrypted with a first encryption method in the relation, wherein the data items form a partially ordered set in the relation, the partial order being formed with respect to the data items in non-encrypted form, the method comprising for inserting multiple encrypted data items in the partially ordered set:
determining that the multiple data items have a same insert position in the partially ordered set;
sorting the multiple encrypted data items in accordance with a linear order corresponding to the order in which the encrypted data items are stored in the relation with respect to the partial ordered set, wherein depending on the insert position the sorting is performed in ascending or descending order;
encrypting the multiple data items using the first encryption method;
inserting the encrypted data items in the partially ordered set consecutively in their sorted order.

2. The method of feature combination 1, wherein a request for inserting the multiple data items is received at a single client computer, wherein the sorting is performed by the single client computer using the unencrypted content of the multiple data items to be inserted.

3. The method of feature combination 1 or 2, wherein the determining that the multiple data items have a same insert position in the partially ordered set is performed in parallel at the client computer that is connected to the server computer and completed before starting the inserting.

4. The method of any of the previous feature combinations, wherein the sorting is performed in descending order if the insert position has a corresponding order in the partially ordered set that succeeds the order of an immediately preceding data item of the insert position, wherein the sorting is performed in ascending order if the insert position has a corresponding order in the partially ordered set that precedes the order of an immediately preceding data item of the insert position.

5. The method of any of the previous feature combinations, the partially ordered set comprising a rooted tree, wherein the insert position has a leaf node as its parent node in the rooted tree.

6. The method of any of the previous feature combinations, the partially ordered set comprising an rooted tree, the inserting of the multiple data items comprising for each data item of the multiple data items:
in response to determining that the insert position is free, inserting the data item in the insert position described by the parent node of the insert position and information indicating whether the insert position has an order that is preceding or succeeding the parent node;
in response to determining that the insert position is occupied:
in case the sorting is performed in a descending order inserting the data item in a position making the data item the lowest ordered item in the parent node's subtree which contains only data items ordered higher than the parent node;
in case the sorting is performed in an ascending order inserting the data item in a position making the data item the highest ordered item in the parent node's subtree which contains only data items ordered lower than the parent node;

7. The method of feature combination 6, further comprising: after each inserting step and in response to determining that the rooted tree is imbalanced rebalancing the rooted tree.

8. The method of any of the previous feature combinations, wherein multiple requests for inserting the multiple data items are received at the client computer simultaneously.

9. The method of any of the previous feature combinations 1-7, wherein multiple requests for inserting the multiple data items are collected at the client computer during a predetermined time period.

10. The method of any of the previous feature combinations 3-9, wherein the first encryption method is an order preserving encryption method, wherein the sorting is performed by the server computer based on the encrypted content of the multiple data items.

12. The method of any of the previous feature combinations, the partially ordered set comprising an AVL tree or a binary search tree.

A method for a server computer, the server computer comprising a relation, the relation comprising data items, wherein the data items are encrypted with a first encryption method in the relation, wherein the data items form a partially ordered set in the relation, the partial order being formed with respect to the data items in non-encrypted form, the method comprising: inserting encrypted data items in the partially ordered set consecutively in a sorted order, the sorting being in accordance with a linear order corresponding to the order in which the encrypted data items are stored in the relation with respect to the partial ordered set, wherein depending on the insert position the sorting is in ascending or descending order.

A method for a client computer of a computer system, the computer system comprising a relation, the relation being stored on a server computer of the computer system, the relation comprising data items, wherein the data items are encrypted with a first encryption method in the relation, wherein the data items form a partially ordered set in the relation, the partial order being formed with respect to the data items in non-encrypted form, wherein for inserting multiple encrypted data items in the partially ordered set: the method comprising: determining that the multiple data items have a same insert position in the partially ordered set; sorting the multiple encrypted data items in accordance with a linear order corresponding to the order in which the encrypted data items are stored in the relation with respect to the partial ordered set, wherein depending on the insert position the sorting is performed in ascending or descending order; encrypting the multiple data items using the first encryption method; sending the encrypted multiple data items to the server computer for inserting the encrypted data items in the partially ordered set consecutively in their sorted order.

A computer program product, the computer program product comprising a computer readable storage medium having program instructions embodied therewith, the program instructions executable by a processor to cause the processor to perform any of the previous feature combinations.

The invention claimed is:

1. A computer implemented method for inserting multiple data items in a relation, the relation being stored on a server computer, the relation comprising first data items, wherein the first data items are encrypted with a first encryption method in the relation, wherein the first data items form a partially ordered set in the relation, a partial order being formed with respect to the first data items in non-encrypted form, the method comprising:
   determining that second data items among the multiple data items have a same insert position in the partially ordered set;
   sorting only the second data items in accordance with a linear order corresponding to an order in which the first data items are stored in the relation with respect to the partially ordered set in response to the determining that the second data items have the same insert position, wherein the sorting is performed in ascending or descending order depending on the insert position;
   encrypting the second data items using the first encryption method; and
   inserting the encrypted second data items in the partially ordered set consecutively based on the sorting,
   wherein the determining that the second data items have the same insert position in the partially ordered set is performed in parallel at a client computer that is connected to the server computer and completed before starting the inserting,
   wherein the partially ordered set includes a rooted tree, and
   wherein, for each data item of the encrypted second data items, the inserting the encrypted second data items includes
      in response to determining that the insert position is free, inserting the data item in the insert position described by a parent node of the insert position and information indicating whether the insert position has an order that is preceding or succeeding the parent node,
      in response to determining that the insert position is occupied and in case the sorting is performed in descending order, inserting the data item in a position making the data item the lowest ordered item in a subtree of the parent node that contains only data items ordered higher than the parent node, and
      in response to determining that the insert position is occupied and in case the sorting is performed in ascending order, inserting the data item in a position making the data item the highest ordered item in a subtree of the parent node that contains only data items ordered lower than the parent node.

2. The method of claim 1, wherein a request for inserting the second data items is received at a single client computer, wherein the sorting is performed by the single client computer using unencrypted content of the second data items.

3. The method claim 1, wherein the sorting is performed in descending order if the insert position has a corresponding order in the partially ordered set that succeeds the order of an immediately preceding data item of the insert position, wherein the sorting is performed in ascending order if the insert position has a corresponding order in the partially ordered set that precedes the order of an immediately preceding data item of the insert position.

4. The method of claim 1, wherein the insert position has a leaf node as a parent node in the rooted tree.

5. The method of claim 1, further comprising:
   rebalancing the rooted tree after each inserting step and in response to determining that the rooted tree is imbalanced.

6. The method of claim 1, wherein multiple requests for inserting the second data items are received at the client computer simultaneously.

7. The method of claim 1, wherein multiple requests for inserting the multiple data items are collected at the client computer during a time period.

8. The method of claim 1, wherein the first encryption method is an order preserving encryption method, wherein the sorting is performed by the server computer based on encrypted content of the second data items.

9. The method of claim 1, wherein the partially ordered set includes an AVL tree or a binary search tree.

10. A computer system for inserting multiple data items in a relation, the relation being stored on a server computer of the computer system, the relation comprising first data items, wherein the first data items are encrypted with a first encryption method in the relation, wherein the first data items form a partially ordered set in the relation, a partial order being formed with respect to the first data items in non-encrypted form, the computer system comprising:
   a client computer configured to
      determine that second data items among the multiple data items have a same insert position in the partially ordered set,
      sort only the second data items in accordance with a linear order corresponding to an order in which the first data items are stored in the relation with respect to the partially ordered set in response to determining that the second data items have the same insert position, wherein the sorting is performed in ascending or descending order depending on the insert position, and
      encrypt the second data items using the first encryption method; and
   the server computer configured to
      insert the encrypted second data items in the partially ordered set consecutively based on the sorting,
      wherein the determining that the second data items have the same insert position in the partially ordered set is performed in parallel at the client computer and completed before starting the inserting,
      wherein the partially ordered set includes a rooted tree, and
      wherein, for each data item of the encrypted second data items, the server computer is further configured to insert the encrypted second data items by
         in response to determining that the insert position is free, inserting the data item in the insert position described by a parent node of the insert position and information indicating whether the insert position has an order that is preceding or succeeding the parent node,
         in response to determining that the insert position is occupied and in case the sorting is performed in descending order, inserting the data item in a position making the data item the lowest ordered item in a subtree of the parent node that contains only data items ordered higher than the parent node, and
         in response to determining that the insert position is occupied and in case the sorting is performed in ascending order, inserting the data item in a position making the data item the highest ordered item in a subtree of the parent node which contains only data items ordered lower than the parent node.

11. The computer system of claim 10, wherein the client computer is configured to receive a request for inserting the second data items, wherein the sorting is performed using unencrypted content of the second data items.

12. The computer system of claim 10, wherein the client computer is configured to
perform the sorting in descending order if the insert position has a corresponding order in the partially ordered set that succeeds the order of an immediately preceding data item of the insert position, and
perform the sorting in ascending order if the insert position has a corresponding order in the partially ordered set that precedes the order of an immediately preceding data item of the insert position.

13. The computer system of claim 10, wherein the insert position has a leaf node as a parent node in the rooted tree.

14. The computer system of claim 10, wherein the server computer is further configured to:
rebalance the rooted tree after each inserting step and in response to determining that the rooted tree is imbalanced.

15. The computer system of claim 10, wherein the client computer is configured to simultaneously receive multiple requests for inserting the second data items.

16. The computer system of claim 10, wherein the client computer is configured to collect multiple requests for inserting the second data items during a time period.

17. The computer system of claim 10, wherein the partially ordered set includes an AVL tree or a binary search tree.

18. A server computer, the server computer comprising a relation, the relation comprising first data items, wherein the first data items are encrypted with a first encryption method in the relation, wherein the first data items form a partially ordered set in the relation, a partial order being formed with respect to the first data items in non-encrypted form, the server computer being configured to:
receive, from a client computer, encrypted second data items in a sorted order, the sorted order being in accordance with a linear order corresponding to an order in which the first data items are stored in the relation with respect to the partially ordered set, wherein the sorting is in ascending or descending order depending on an insert position, the insert position being determined in parallel at the client computer and completed before starting insertion of the encrypted second data items at the server computer, and the encrypted second data items include only data items which have the same insert position in the partially ordered set; and
insert the encrypted second data items in the partially ordered set consecutively in the sorted order in response to receiving the encrypted second data items in the sorted order,
wherein the partially ordered set includes a rooted tree, and
wherein, for each data item of the encrypted second data items, the server computer is further configured to insert the encrypted second data items by
in response to determining that the insert position is free, inserting the data item in the insert position described by a parent node of the insert position and information indicating whether the insert position has an order that is preceding or succeeding the parent node,
in response to determining that the insert position is occupied and in case the sorting is performed in descending order, inserting the data item in a position making the data item the lowest ordered item in a subtree of the parent node that contains only data items ordered higher than the parent node, and
in response to determining that the insert position is occupied and in case the sorting is performed in ascending order, inserting the data item in a position making the data item the highest ordered item in a subtree of the parent node that contains only data items ordered lower than the parent node.

19. A client computer for a computer system, the computer system comprising a relation, the relation being stored on a server computer of the computer system, the relation comprising first data items, wherein the first data items are encrypted with a first encryption method in the relation, wherein the first data items form a partially ordered set in the relation, a partial order being formed with respect to the first data items in non-encrypted form, the client computer configured to:
determine that second data items among multiple data items to be inserted in the partially ordered set have a same insert position in the partially ordered set;
sort only the second data items in accordance with a linear order corresponding to an order in which the first data items are stored in the relation with respect to the partially ordered set in response to determining that the second data items have the same insert position, wherein the sorting is performed in ascending or descending order depending on the insert position;
encrypt the second data items using the first encryption method; and
send the encrypted second data items to the server computer for inserting the encrypted second data items in the partially ordered set consecutively based on the sorting,
wherein the client computer is further configured to determine that the second data items have the same insert position in the partially ordered set in parallel, and to complete the determination before sending the encrypted second data items,
wherein the partially ordered set includes a rooted tree, and
wherein, for each data item of the encrypted second data items, the server computer is further configured to insert the encrypted second data items by
in response to determining that the insert position is free, inserting the data item in the insert position described by a parent node of the insert position and information indicating whether the insert position has an order that is preceding or succeeding the parent node,
in response to determining that the insert position is occupied and in case the sorting is performed in descending order, inserting the data item in a position making the data item the lowest ordered item in a subtree of the parent node that contains only data items ordered higher than the parent node, and
in response to determining that the insert position is occupied and in case the sorting is performed in ascending order, inserting the data item in a position making the data item the highest ordered item in a subtree of the parent node that contains only data items ordered lower than the parent node.

* * * * *